Oct. 6, 1959
D. D. WILLARD ET AL
2,907,886
RADIATION RESPONSIVE DEVICES
Filed Dec. 5, 1955
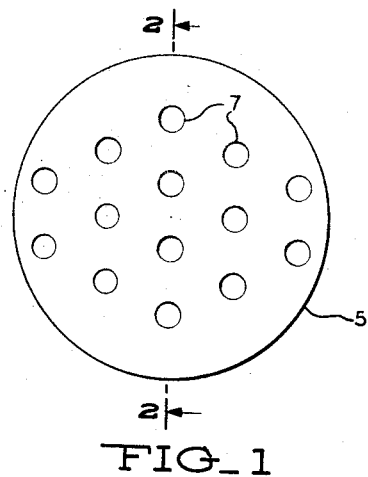
FIG_1
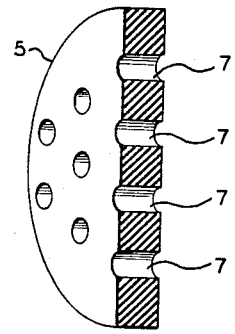
FIG_2
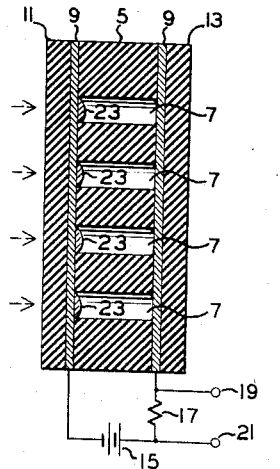
FIG_3
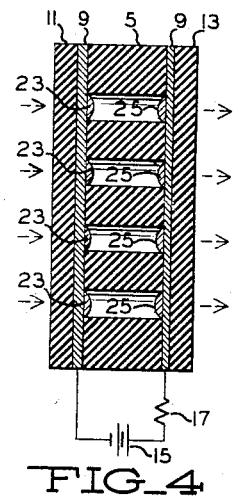
FIG_4
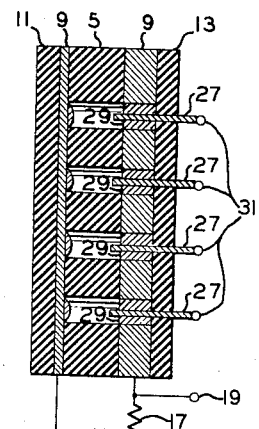
FIG_5
INVENTORS
DENNIS D. WILLARD
BY GUSTAV V. A. MALMROS
Paul M. Brannen
AGENT United States Patent Office 2,907,886
Patented Oct. 6, 1959

2,907,886

RADIATION RESPONSIVE DEVICES

Dennis D. Willard, Endicott, and Gustav V. A. Malmros, Binghamton, N.Y., assignors to International Business Machines Corporation, New York, N.Y., a corporation of New York Application December 5, 1955, Serial No. 550,931

1 Claim. (Cl. 250—213)

This invention relates to radiation responsive devices, and particularly to an improved construction of multi-element radiation responsive devices for providing a plurality of radiation sensing elements in a relatively small space.

In systems requiring the sensing of radiations impinging upon a certain surface, it is often desirable to provide a large number of small discrete radiation sensing devices so that the area of the impinging radiation is more definitely determined. For example, it is useful in some instances to provide a radiation sensing means which will provide an output signal which is proportional to the area of the incident radiation falling upon a surface. The usual construction of such a device comprises the assembling of a plurality of individual radiation sensitive elements into a suitable mosaic. However, each of the individual units occupies a relatively large volume of the available space and the construction and assembly of a plurality of such units into a matrix or mosaic is a relatively costly and time-consuming operation.

It is accordingly an object of this invention to provide an improved multi-element radiation responsive device which requires a minimum of physical space.

Another object of this invention is to provide an improved multi-element radiation responsive device.

A further object of this invention is to provide a multi-element radiation responsive device including a plurality of individual chambers formed in a plate of non-conductive material which is opaque to the radiation to be sensed.

Still another object of this invention is to provide an improved multi-element radiation responsive device utilizing a sheet of electrically non-conductive material having an oriented porosity which provides a large number of separate chambers, each of which is arranged to conduct an electrical current when activated by impinging radiation.

A further object of this invention is to provide an improved radiation responsive device which provides an electrical output proportional to the area of incident radiation.

Another object of this invention is to provide an improved radiation responsive device which may be employed as a light amplifier.

Another object of this invention is to provide an improved multi-element radiation responsive device which can provide individual electrical output signals for each of the elements of the device, to yield a pattern of electrical signals corresponding to the pattern of the incident radiation.

Other objects of the invention will be pointed out in the following description and claim and illustrated in the accompanying drawings, which disclose, by way of examples, the principle of the invention and the best mode, which has been contemplated, of applying that principle.

In the drawings:

Fig. 1 is a diagrammatic plan view of a multi-chambered sheet of insulating material which forms the basic or body element of the preferred embodiments of the invention.

Fig. 2 is a diagrammatic sectional perspective view of the material shown in Fig. 1, taken along the lines 2—2 of Fig. 1.

Fig. 3 is a diagrammatic sectional view of a first embodiment of the invention, which provides an electrical output signal proportional to the area of the incident radiation pattern.

Fig. 4 is a diagrammatic sectional view of a second embodiment of the invention, which provides a light amplifying device.

Fig. 5 is a diagrammatic sectional view of a third embodiment of the invention, which provides a plurality of electrical signals having a pattern corresponding to the pattern of incident radiation.

Similar reference characters refer to similar parts in each of the several views.

Briefly described, this invention utilizes a sheet of non-conductive material, that is, having a relatively high coefficient of volume resistivity, opaque to the radiation to be sensed, which is provided with an oriented porosity, to provide a large number of open-ended chambers or cells in a relatively small volume, and with the chambers relatively closely spaced in the material. The term "oriented porosity" as used hereinafter in the specification and claims shall be taken to mean the physical attribute of a material in which a relatively large number of openings or passages exist therein with respect to the total volume, and which passages are continuous from one surface of the material to an opposite surface, and all of which passages are substantially parallel to one another throughout their length. Suitable end plates or coverings are applied to each side of the sheet, with the result that a large number of sealed cells or chambers are realized, each chamber extending to the surface of the device upon which the radiation impinges. Each of the chambers is provided with a suitable amount of material which is rendered electrically conductive when the radiation to be sensed enters the chamber. Electrical connections are established at each end of each chamber, as by providing a suitable conductive inner layer on each of the end plates, which layer is substantially transparent to the radiation to be sensed. Accordingly, electrical conduction is established in each of the chambers exposed to the incident radiation. This conduction may be effectively utilized to derive suitable electrical output signals, or, if the conduction within the chamber produces a luminous discharge, the device may be employed as a light amplifier in the case where the input radiations are light rays.

Referring now to the drawings, Figs. 1 and 2 illustrate a sheet of material 5 provided with a large plurality of openings 7 extending therethrough, only a few being shown in the drawing for the sake of clarity. It is necessary that this material be electrically non-conductive, and opaque to the radiation to be sensed. Thus in the case of a device which is to respond to visible light, the material for the sheet 5, may be opaque glass, ceramic material, or any one of numerous plastic materials.

The openings or chambers 7 in the sheet 5 may be formed by any suitable method, such as drilling, etching, leaching, casting, etc. The method employed would vary depending upon the material chosen, its thickness, and the size and spacing of the chambers. In general, the chambers are quite closely spaced, and it may be readily seen that the number of chambers per unit area may be made quite large.

Having thus provided the sheet or body element 5 with an oriented porosity as shown and described, suitable means are provided for rendering each chamber separately responsive to incident radiation. Three possible arrangements are shown and will be described in detail but it is understood that other arrangements may be readily accomplished by those skilled in the art.

In general, sheets of suitable material which form end plates, or covers, are attached to each side of the chambered sheet, so that a plurality of closed chambers are provided. Each chamber has included therein a suitable material or combination of materials having the property of rendering the space in the chamber electrically conductive when irradiated by the radiation to be sensed. Such material or materials may be solid, liquid, or gaseous and is normally non-conductive but becomes conductive when irradiated by the particular radiation which is to be detected. As an example, each of the chambers could be filled with a polyatomic gas and a small amount of material, such as potassium, placed in each chamber, so that visible light radiation will cause the potassium to render the gas conductive.

A suitable potential difference is produced between the opposite ends of each of the chambers or cells by the provision of electrodes at the ends of each of the chambers, which electrodes are connected externally to a suitable source of electrical energy, such as a battery, for example. These end or cell electrodes may take a number of forms, such as suitable conductive sheets, transparent to the radiation to be sensed, and sandwiched between the end or cover plates and the body sheet of the device. Also a conductive layer, transparent to the radiation, may be deposited either on the body sheet or the end plates. For example, in the case of a unit which is to respond to visible light, a very thin and transparent metallic film may be deposited on the inner surface of the cover plate or the surface of the body sheet, as by sputtering, evaporation or other well-known techniques. Other possible arrangements will suggest themselves to those skilled in the art, and it is deemed sufficient to state that any suitable arrangement may be employed to establish electrical connections to the opposite ends of each chamber, with suitable provisions for connecting external circuits to the electrodes.

The parts are proportioned and arranged so that the potential difference between the chamber or cell electrodes is insufficient to cause conduction in any of the chambers, in the absence of radiation. When stimulated by the proper radiation, however, the material within a chamber so stimulated becomes conductive, so that a flow of current takes place in each of the irradiated chambers. This flow of current may be indicated by suitable means exterior to the device, and, as previously pointed out, if a luminous discharge is produced within a chamber as a result of conduction, the device may be employed as a light amplifier.

The embodiment of the invention shown in Fig. 3 of the drawings provides a radiation responsive device capable of producing an electrical signal proportional to the area of incident radiation. The chambers 7 in body element 5 are covered by sheets of electrically conductive material or electrodes 9 of which at least one is transparent to the incident radiation. As here shown, the incident radiation is considered as proceeding from the left, as indicated by the dotted arrows, so that the electrically conductive sheet 9 on the left end side of the device must be transparent to the radiation. The sheet 9 at the right end side of the device may or may not be transparent, as desired. A front end plate 11 and a back end plate 13 are shown, which plates may be made of suitable insulating material. Again, the end plate 11, through which the radiation must pass to the chamber 7, must be transparent to the radiation, but end plate 13 need not be transparent. Obviously, if the electrodes and end plates at both ends of the chamber 7 are transparent to the radiation, the device will sense radiation on either end, which may be desirable in some instances.

The end electrodes 9 are connected by suitable means to a source of electrical energy, such as the battery 15. A resistor 17, connected between the source and one of the electrodes, provides an output voltage across output terminals 19 and 21 which is proportional to the current flowing through the resistor. The parts are selected and arranged so that the potential difference between the end electrodes 9 is normally insufficient to cause any conduction, so that the current flow through resistor 17 is normally zero, or a very small value which may result from leakage through the body element 5. Hence the output voltage across terminals 19 and 21 is normally zero or some relatively small value.

Within each of the chambers 7 of Fig. 3 there is provided a suitable material or materials which become conductive when exposed to radiation of the type to be sensed. For example, each of the chambers may be filled, at a low pressure, with some readily ionizable gas, such as a gas or vapor having a relatively high molecular weight, e.g., ether, ethyl alcohol and the like. Ionizable liquid or solid substances may also be used, since the only requirement for this material is that it be substantially non-conducting or conducting, according as it is or is not irradiated. Moreover, various combinations of materials may be employed to increase the sensitivity of the device. In the preferred embodiments, a small amount of an element having a low work function, such as potassium or cesium, may be included in each chamber, to enhance the ionization of the medium by visible radiation. Such material is shown in the drawings as small globules or spots 23, adhering to the end electrodes at the left-hand or front end of the devices.

When radiation of sufficient intensity enters any one of the chambers 7, the material within the chamber is rendered conductive, so that current flows therethrough, thus causing a predetermined voltage drop across resistor 17. It is apparent that each of the chambers are effectively connected in parallel, with respect to the external circuit, so that the total voltage drop across resistor 17, and hence the output voltage at terminals 19 and 21 will be proportional to the number of cells which are conducting, which in turn is determined by the area of incident radiation upon the device. Thus the arrangement shown in Fig. 1 is capable of supplying an electrical output signal proportional to the area of incident radiation.

Fig. 4 shows a modification of the device which may be employed as a light amplifier, in which incident light radiation is, in effect, amplified and retransmitted. The construction of the device shown in Fig. 4 is generally the same as that described in connection with the device shown in Fig. 3, with the changes therefrom described in detail below.

A suitable material which becomes luminescent under certain conditions is provided at the right-hand end or back of each cell, such as a small globule or spot 25 of a suitable phosphor or other material which gives off light when subjected to ion, electron and/or photon bombardment, or which reacts to alternating potentials, such as the electro-luminescent phosphors. The end cover or plate 13 and the cell electrode 9 at the right-end side of the cell, as seen in Fig. 4, must be transparent to the radiation produced by the luminescent material within the cell.

In operation, when incident radiation entering a chamber at the left causes conduction therein, the luminescent material at the right-hand side of the chamber will emit radiation, and the parts may be proportioned and arranged so that the emitted radiation has a greater intensity that received, so that the incoming radiation is effectively amplified. It will be apparent that the pattern of the incident radiation will be reproduced by the transmitted radiation, with the resolution determined by the number of cells per unit area.

An inherent feed-back effect in which the radiation emitted by the luminescent material serves to keep the associated cell or chamber conductive may be utilized in this device to provide a storage or "memory" device, in which the pattern of the incident radiation will be preserved and retransmitted until such time as the external supply of energy is cut off or reduced to such a value that conduction in the cells ceases. If such an effect is not desired, a conductive material, which is opaque to the particular radiation, may be interposed in the cells between the luminescent material and the remainder of the cell. In such a case, no optical feed-back would exist and presence or absence of transmitted radiation would be governed by presence or absence of received radiation, assuming that the source of energy is continuously connected to the device.

Fig. 5 shows a cross-sectional view of another modification of the invention, in which a separate electrical output signal is provided for each of the chambers which may be irradiated. This arrangement is generally similar to that shown in Fig. 3, except that a plurality of conductive probes 27 are provided, one for each chamber in the cell. As shown, each probe 27 is centered in an associated resistance insert 29 of suitable material having a relatively high resistivity, with the inserts in turn being mounted in the conductive plate 9 at the rear of the cell, the parts being proportioned and arranged so that the current which flows through each cell will pass through the cell probe, the associated resistance insert, and the conductive back plate. A voltage drop is accordingly developed across each of the inserts for the cells or chambers which are rendered conductive by incident radiation. Accordingly, each chamber is capable of developing an individual output signal voltage at its associated output terminal 31, the reference point for each output signal being the common output terminal 19.

It will be obvious to those skilled in the art that conventional resistors, one for each probe, may be utilized in the embodiment shown in Fig. 4, rather than supplying resistance inserts as shown. In such a case, the conductive end plate 9 at the rear of the cell would be eliminated, the probes 27 passing through the insulating back plate 13 directly into the chambers 7. A suitable resistor is provided for each probe, connected at one end to the probe or associated terminal 31, and connected at the other end to the common terminal 19.

On the other hand, if each of the probes is connected to an associated current sensitive device, a series circuit may be employed in which each probe is connected to the source 15 by a series circuit including the current sensitive device.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claim.

What is claimed is:

A radiation responsive device for providing a pattern of electrical output signals corresponding to the pattern of incident radiation upon a receiving portion of said device, comprising, in combination, a body element composed of material which is electrically non-conductive and which is opaque to the incident radiation, said body element having an oriented porosity so that a plurality of separate openings extending from a first to a second surface of said body element are provided, sealing means for sealing said openings at said first surface and establishing a first electrical connection to the corresponding end of each of said openings, said sealing means being transparent to said incident radiation, whereby the incident radiation upon said first surface of said body element irradiates one or more of the openings in said body element in a pattern corresponding to the incident radiation pattern, a conductive plate affixed to the second surface of said body element, a plurality of resistance material inserts, one for each of said openings, disposed in said conductive plate and proportioned and arranged to completely cover the associated opening, a plurality of probes of conductive material, one for each of said openings, disposed substantially through the center of each resistance material insert, means disposed in each of the chambers formed by said openings, said sealing means and said resistance material inserts for rendering the enclosed space electrically conductive when and only when the enclosed space is irradiated by said incident radiation, means for connecting said first electrical connection to one terminal of a source of electrical energy, a common output terminal, and means for connecting said conductive plate and said common output terminal to the other terminal of said source, whereby a voltage signal is developed between said probes and said common output terminal for each of said chambers which is irradiated, to provide a pattern of voltage signals corresponding to the pattern of said incident reduction.

References Cited in the file of this patent

UNITED STATES PATENTS

| | | |
|---|---|---|
| 1,724,298 | Miller | Aug. 13, 1929 |
| 1,907,124 | Ruben | May 2, 1933 |
| 1,936,514 | Lengnick | Nov. 21, 1933 |
| 2,120,765 | Orvin | June 14, 1938 |
| 2,480,113 | Betzler | Aug. 20, 1949 |
| 2,495,697 | Chilowsky | Jan. 31, 1950 |
| 2,721,950 | Piper | Oct. 25, 1955 |
| 2,728,835 | Mueller | Dec. 27, 1955 |
| 2,773,992 | Ullery | Dec. 11, 1956 |
| 2,777,040 | Kazan | Jan. 8, 1957 |